United States Patent [19]
Sandy et al.

[11] Patent Number: 5,676,469
[45] Date of Patent: Oct. 14, 1997

[54] LASER-WELDED BEARING AND METHOD OF MAKING SAME

[75] Inventors: Michael R. Sandy, Ithaca; Tarry D. Stahl, Ashley, both of Mich.

[73] Assignee: Federal-Mogul Corporation, Southfield, Mich.

[21] Appl. No.: 794,700

[22] Filed: Feb. 4, 1997

[51] Int. Cl.$^6$ .................................................. F16C 17/02
[52] U.S. Cl. ........................................ 384/296; 384/273
[58] Field of Search .................................. 384/296, 295, 384/271, 272, 273, 282

[56] References Cited

U.S. PATENT DOCUMENTS

| | | | |
|---|---|---|---|
| 4,044,441 | 8/1977 | Morrison | 29/149 |
| 4,326,118 | 4/1982 | Smith | 219/121 |
| 4,471,204 | 9/1984 | Takafuji et al. | 219/121 |
| 4,751,777 | 6/1988 | Savel | 29/149 |

FOREIGN PATENT DOCUMENTS 1512782  6/1978  United Kingdom ............ F16C 33/04

*Primary Examiner*—Lenard A. Footland
*Attorney, Agent, or Firm*—Lawrence J. Shurupoff

[57] ABSTRACT

A bimetal sleeve bearing has an axial seam that is laser welded so that both the soft inner layer and hard outer layer of the sleeve are continuous and homogeneous without internal or surface cracks. The seam edges are cut and abutted so as to form an axial groove in the inner surface of the outer layer. During the laser welding operation, fused material from the inner layer flows into the groove to form a crack-free lining for the bearing.

12 Claims, 2 Drawing Sheets

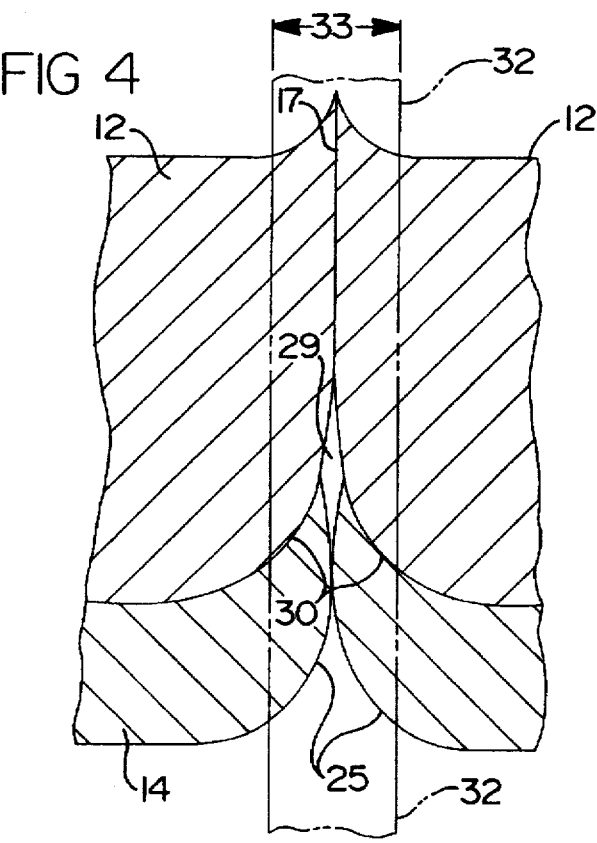
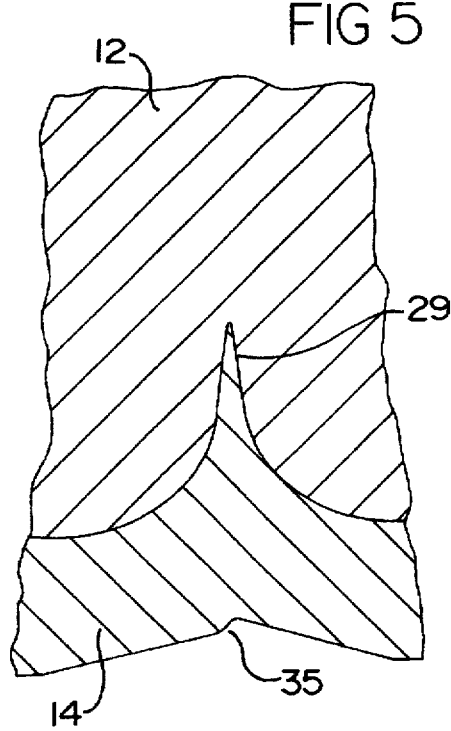
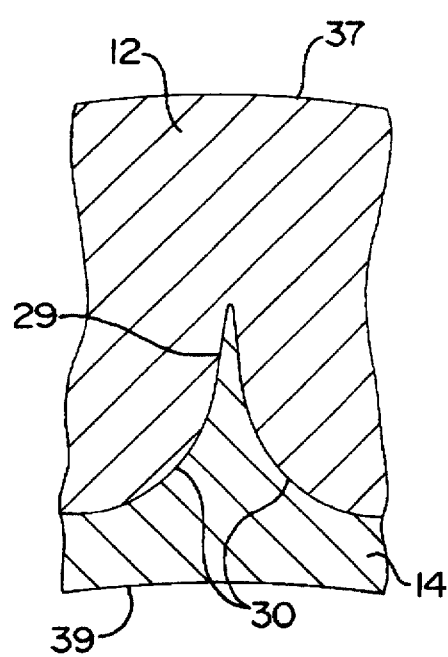
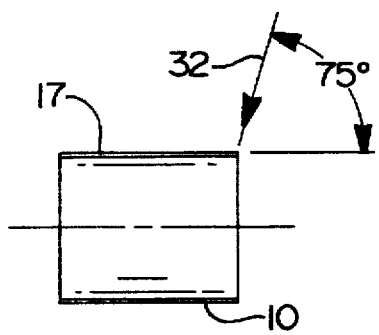

LASER-WELDED BEARING AND METHOD OF MAKING SAME

BACKGROUND OF THE INVENTION

1. Field of the Invention

The present invention relates to a laser welded sleeve bearing, particularly a bimetal sleeve bearing adapted for use as a camshaft bearing having an outer steel reinforcement layer and an inner soft metal load-bearing layer.

2. Description of Prior Developments

Sleeve bearings and bushings have typically been formed with a relatively rigid outer support layer and an inner conformable load-bearing layer. The outer layer is usually formed of steel. The inner layer can be formed of various alloys containing aluminum, tin, lead, copper, silicon and other alloying elements. The alloys used for the inner layer contribute various desirable characteristics such as conformability, oil affinity, seizure resistance, wear resistance and fatigue resistance.

Typically, such sleeve bearings are formed by first bonding two flat strips together, using heat and pressure or quench casting techniques, whereby a bimetal strip of material is produced. The bimetal strip is then curved into a tubular configuration, after which the mating axial edges of the tube are welded together to form the sleeve bearing.

U.S. Pat. No. 4,751,777 describes a process for forming a sleeve bearing or bushing wherein mating axial edges of a bimetal strip are welded together to form a tubular sleeve bearing. A laser welding procedure is carried out so that only the outer steel layer is fused by the laser beam such that the bearing surface is not degraded by the welding operation.

With the process described in U.S. Pat. No. 4,751,777, the inner bearing surface has an axial crack therein running the full length of the bearing. Such a crack can collect foreign particles leading to potential bearing deterioration. Also, the crack can produce a small ledge if the mating edges at the welded joint are not precisely aligned. Such a ledge can provide a bearing high spot that is prone to premature wear. Moreover, the appearance of a crack in a bearing surface is generally considered undesirable by certain installers and end users.

U.S. Pat. No. 4,044,441 shows a bimetal sleeve bearing formed out of two semi-cylindrical sections welded along two weld lines spaced one hundred eighty degrees apart, i.e. on a diametrical plane passing through the sleeve axis. With this arrangement, the bearing surface has two axially extending cracks that have the same disadvantages possessed by the arrangement of U.S. Pat. No. 4,751,777.

SUMMARY OF THE INVENTION

The present invention is directed to a bimetal sleeve bearing formed from a single curved bimetal strip so that the bearing surface is continuous and free of cracks and surface discontinuities. The crack-free bearing surface eliminates problems associated with the sleeve bearings disclosed above.

The bearing of the present invention is formed out of a single bimetal strip that is cut to a length corresponding to the circumferential dimension of the bearing sleeve. The strip-cutting operation is carried out so that the cutting blade initially slices through the bearing layer and then through the steel layer. Edge areas of the severed strip are displaced by the blade motion so that the edge of the soft bearing layer has a chamfer, and the edge of the steel layer has a protruding flange or flash.

The severed bimetal strip is curved into a cylindrical tubular configuration, after which the abutting edges of the strip are laser welded together to form a sleeve bearing.

During the welding operation, the soft metallic materials on the mating chamfered edges of the strip fuse and flow into a narrow groove formed along chamfered edge areas of the steel strip. This action eliminates or prevents an axial crack that would otherwise be formed on the inner load-bearing surface of the bearing. The inner surface of the bearing is virtually continuous and free of cracks.

The inner and outer surfaces of the sleeve bearing are machined to provide smooth surface contours, especially along the welded joint or seam.

The invention is directed to a bimetal sleeve bearing formed out of a single bimetal strip without the presence of a visible axial crack along the inner or outer surface of the sleeve. Specific features and advantages of the invention will be apparent from the attached drawings and description of an illustrative embodiment of the invention.

The aforementioned objects, features and advantages of the invention will, in part, be pointed out with particularity and will, in part, become obvious from the following more detailed description of the invention, taken in conjunction with the accompanying drawings, which form an integral part thereof.

BRIEF DESCRIPTION OF THE DRAWINGS

In the Drawings:

FIGS. 4, 5 and 6 are enlarged fragmentary views of a joint or seam formed by abutting the ends of the bimetal strip together when the strip is in the FIG. 3 tubular configuration. FIG. 4 shows the joint prior to a laser welding operation. FIG. 5 shows the joint after the welding operation. FIG. 6 shows the joint after the inner and outer surfaces of the tube or sleeve have been machined.

FIG. 7 is a side view of the FIG. 1 sleeve bearing showing the path taken by a laser beam during a laser welding operation on the longitudinal seam of the sleeve.

In the various figures of the drawings, like reference characters designate like parts.

DETAILED DESCRIPTION OF THE PREFERRED EMBODIMENTS

Figure 1:
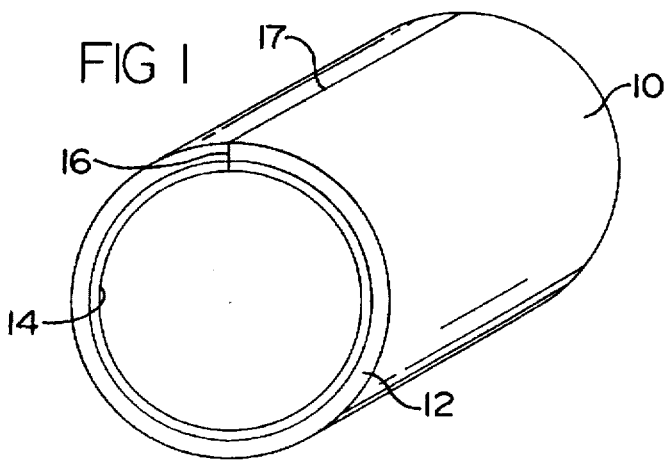
FIG. 1 is a perspective view of a bimetal sleeve bearing of the type contemplated by the present invention.

Referring to FIG. 1, there is shown a bimetal sleeve bearing or bushing 10 that includes an outer annular steel layer 12 and an inner annular load-bearing layer or lining 14. The bearing is formed out of a single bimetal strip that is curved into a cylindrical configuration wherein axial edges 16 of the strip abut together to form an axial seam 17 extending the full axial length of the bearing. Edges 16 are laser welded together to form the seam.

The present invention is concerned with a construction whereby the welded seam 17 is formed and treated so that the inner and outer surfaces of the sleeve bearing are continuous, without any visible cracks or discontinuities, especially along seam 17.

Figure 2:
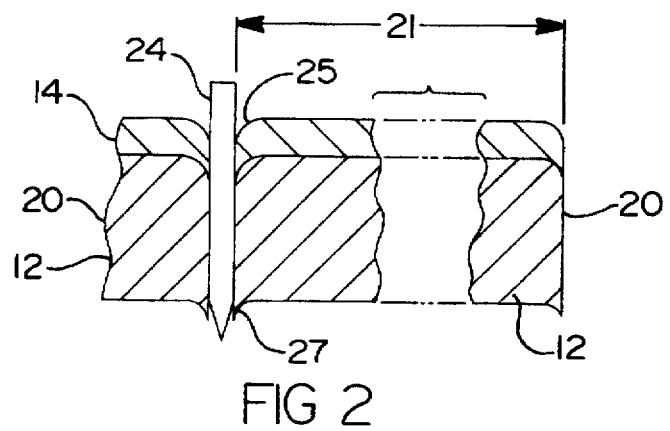
FIG. 2 is a fragmentary sectional view taken through a cutting blade and bimetal strip during a strip-severing operation. The severed strip can be used to form a sleeve bearing under the present invention.

FIG. 2 shows a flat bimetal strip 20 that can be used to form the sleeve bearing. As shown, the strip includes a first relatively thick steel layer 12 and a thinner relative soft bearing layer 14. The load-bearing layer can be formed of various alloys containing aluminum, tin, lead, copper and other alloying materials. Thus, the load-bearing layer can be known babbitt materials having fusion temperatures substantially lower than the fusion temperature of steel.

The steel layer 12 and bearing layer 14 can be laminated together using various different procedures, as shown, e.g., in U.S. Pat. Nos. 3,078,563 or 2,763,058.

FIG. 2 shows the flat bimetal strip being cut transversely by a downwardly moving blade 24 to form a bimetal strip section 20 having a length dimension 21 that is the same as the circumferential dimension of the sleeve bearing to be formed by the bimetal strip. As blade 24 slices downwardly through bearing layer 14 and then steel layer 12, the blade exerts a shearing force on the bimetal materials such that a chamfer surface 25 is formed on each edge of the bearing layer 14, and a downwardly protruding flange 27 is formed on each edge of the steel layer 12. Side surfaces of blade 24 exert pressurized frictional forces on the edges formed by the cutting action thereby displacing edge areas of the bimetal downwardly to form chamfer surfaces 25 and edge flanges 27.

Figure 3:
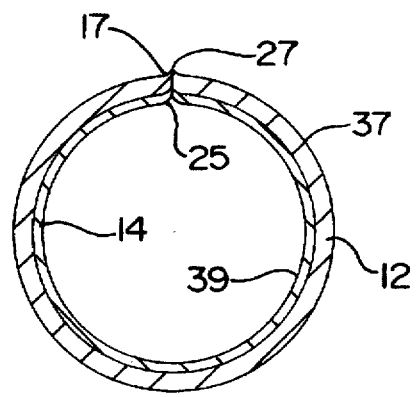
FIG. 3 is a view of a severed bimetal strip curved into a tubular sleeve configuration.

The bimetal strip section 20 is curved into a tubular configuration, as shown in FIG. 3. The surfaces on the abutting edges of the curved strip form a V-shaped groove 29 as shown in FIG. 4. This V-shaped groove has a radial depth dimension that is several times the groove width dimension, e.g., three or four times the width dimension. In FIG. 4, the groove depth dimension extends vertically or radially, whereas the groove width dimension extends horizontally, circumferentially or traverse to the depth dimension.

Groove 29 has a flaring mouth defined by chamfer surfaces 30 on steel layer 12. Edge areas of the bearing layer 14 are in direct contact with chamfer surfaces 30 as a result of the cutting action of blade 24 (FIG. 2).

With the bimetal strip formed into a tubular configuration, as depicted in FIGS. 1 and 3, the seam 17 formed by the abutting edges of the bimetal strip is subjected to a laser welding operation. In FIG. 4, the laser beam is represented by numeral 32. Typically, the laser beam will be a cylindrical beam of optical energy having a width or diameter 33.

As the laser beam moves obliquely downwardly through the steel layer 12 and load-bearing layer or lining 14, the material traversed by the beam undergoes fusion. Accordingly, the abutting edges of the steel layer 12 will be fused together to form a continuous homogeneous steel layer, free from cracks or interruptions. Also, the laser heat will vaporize or boil the lining 14 material in the path of the laser beam. Lining material bordering the path of the laser beam will melt and flow into the space formerly occupied by the vaporized material. Some of the melted lining material will flow into the V-shaped groove 29 by capillary action.

FIG. 5 represents the condition of the seam 17 after the laser welding operation. The lining material 14 includes a fused solidified radial projection substantially filling groove 29. The upward flow of lining material into groove 29 creates a depression 35 in the exposed surface of layer 14.

The laser welding operation may employ a continuous laser source arranged to travel continuously longitudinally along seam 17 so as to consistently weld the length of the seam to the configuration depicted in FIG. 5. The continuous wave laser produces a continuous weld along the length of seam 17. A principal advantage of the arrangement is that lining 14 is homogenous and continuous, without cracks.

After the welding operation has been completed, the exposed surfaces on the outer steel layer 12 and the inner layer 14 are machined to achieve the condition depicted in FIG. 6. As shown in FIG. 6, the outer circumferential surface 37 of steel layer 12 is substantially axially flat and circumferentially circular and the inner surface 39 of lining 14 is substantially axially flat. The actual machined surfaces 37 and 39 are cylindrical and concentric.

Preferably, the machining operations that form surfaces 37 and 39 are carried out without changing the fixturing for the tubular bearing. By maintaining the same turning center during each machining operation, it is possible to achieve a true concentricity of the machined surfaces 37 and 39.

The machined sleeve bearing of FIG. 6 can have various dimensions and wall thicknesses. In one embodiment, outer steel layer 12 has a radial wall thickness of about 0.08 inch, whereas inner bearing layer 14 has a radial wall thickness of about 0.02 inch. The radial depth of the V-shaped groove 29 can be about 0.03 or 0.04 inch, i.e. about forty or fifty percent of the thickness of steel layer 12.

As shown in FIG. 7, the laser beam 32 is angled to the axial direction (vertical in FIG. 4) and through the central axis of the bearing. Typically, the angulation is about seventy-five degrees relative to the bushing surface and the length dimension of seam 17. The purpose in angling the laser beam is to preclude the beam from blowing weld steel material or bearing material out of the seam. The beam is oriented so as to traverse both edges of the steel layer, whereby complete fusion of the seam material is achieved without depleting the weld materials. The laser beam focus spot 33 may be about 600 microns. The power of the beam is selected to achieve a complete weld or melt, i.e. through both the outer steel layer 12 and the inner bearing layer 14.

The welding action is designed to eliminate the axial crack or cracks that is a feature of the constructions depicted in U.S. Pat. Nos. 4,751,777 and 4,044,441. In both the '777 and '441 patent arrangements, the welding operation is controlled so that only the outer steel layer of the bearing is fused. The inner bearing layer is left undisturbed such that at least one axial crack remains in the bearing inner surface after the welding operation.

The present invention is directed to the crack-free bimetal sleeve bearing construction depicted in FIG. 6. The V-shaped groove 29 shown in FIG. 6 provides a reservoir for fused liner material 14, whereby the lining material more effectively bridges the seam 17. After the surfaces of the welded bimetal sleeve have been machined such as by a lathe, as at 37 and 39, the sleeve can function as a sleeve bearing, free from cracks in steel layer 12 and on the load-bearing surface 39.

Obviously, numerous modifications and variations of the present invention are possible in the light of the above teachings. It is therefore to be understood that within the scope of the appended claims, the invention may be practiced otherwise than as specifically described herein.

What is claimed is:

1. A bimetal sleeve bearing, comprising:

an outer annular relatively hard steel support layer and an inner annular relatively soft metallic bearing layer bonded to said steel layer;

said steel layer having an inner cylindrical surface, said inner cylindrical surface having a groove extending axially along the bearing;

said inner layer having an outer surface conforming to the inner surface of the steel layer, said inner layer comprising a radial projection substantially filling said groove.

2. The bearing of claim 1, wherein said inner bearing layer has an inner cylindrical surface that is continuous and free of cracks or surface discontinuities.

3. The bearing of claim 1, wherein said groove is V-shaped.

4. The bearing of claim 3, wherein said V-shaped groove has a radial depth dimension that measures about forty percent of the radial thickness of the steel layer.

5. The bearing of claim 1, wherein said steel layer is substantially continuous and uninterrupted around the entire circumference of the bearing.

6. The bearing of claim 5, wherein said inner layer is substantially continuous and uninterrupted around the entire circumference of the bearing.

7. The bearing of claim 1, wherein said inner bearing layer has an inner cylindrical surface that is machined to form a load-bearing surface, said load-bearing surface being continuous and free of cracks or surface discontinuities.

8. The bearing of claim 1, wherein said steel layer has a cylindrical outer surface.

9. The bearing of claim 8, wherein the outer surface of said steel layer is machined.

10. The bearing of claim 1, wherein said groove has a width dimension and a depth dimension, the depth dimension of said groove being greater than the width dimension.

11. The bearing of claim 10, wherein said groove has a flared mouth.

12. The bearing of claim 11, wherein the depth dimension of said groove is at least three times the width dimension of said groove.

* * * * *